(12) United States Patent
Cerniglia

(10) Patent No.: US 8,186,994 B2
(45) Date of Patent: May 29, 2012

(54) SUCKER PIN BUSHING

(76) Inventor: Anthony J. Cerniglia, Wauconda, IL (US)

( * ) Notice: Subject to any disclaimer, the term of this patent is extended or adjusted under 35 U.S.C. 154(b) by 207 days.

(21) Appl. No.: 11/553,073

(22) Filed: Oct. 26, 2006

(65) Prior Publication Data

US 2007/0290119 A1    Dec. 20, 2007

Related U.S. Application Data

(60) Provisional application No. 60/767,544, filed on Jun. 14, 2006.

(51) Int. Cl.
  *B29C 45/17* (2006.01)
(52) U.S. Cl. .......... 425/567; 425/470; 425/572
(58) Field of Classification Search ............ 249/66.1, 249/67; 384/276, 275, 282; 425/577, 470, 425/567, 572; 411/366.1, 395, 402, 411, 411/500
See application file for complete search history.

(56) References Cited

U.S. PATENT DOCUMENTS

| | | | |
|---|---|---|---|
| 3,433,450 A * | 3/1969 | Garrett et al. | 249/67 |
| 3,897,929 A * | 8/1975 | Hartmann | 249/105 |
| 4,275,263 A * | 6/1981 | Chino | 174/152 R |
| 4,784,499 A * | 11/1988 | Fukute | 384/295 |
| 5,743,912 A * | 4/1998 | Lahille et al. | 606/65 |
| 6,030,162 A * | 2/2000 | Huebner | 411/413 |
| 6,921,403 B2 * | 7/2005 | Cragg et al. | 606/86 R |
| 7,037,309 B2 * | 5/2006 | Weil et al. | 606/304 |
| 7,063,701 B2 * | 6/2006 | Michelson | 606/307 |
| 7,322,978 B2 * | 1/2008 | West, Jr. | 606/60 |
| 2002/0132025 A1 * | 9/2002 | Lee et al. | 425/564 |
| 2003/0086996 A1 * | 5/2003 | Babin et al. | 425/547 |
| 2003/0198702 A1 * | 10/2003 | Kazmer et al. | 425/135 |

* cited by examiner

*Primary Examiner* — Yogendra Gupta
*Assistant Examiner* — Emmanuel S Luk
(74) *Attorney, Agent, or Firm* — Pauley Petersen & Erickson

(57) ABSTRACT

An improved sucker pin bushing for an injection mold is disclosed. In various preferred embodiments, the improved sucker pin bushing maintains much of the configuration of a conventional sucker pin bushing, namely a body portion and a head portion having a larger diameter than the body portion. A shoulder is formed where the body portion meets the head portion. However, the need for a jam screw or other retaining means is eliminated by the present invention by the inclusion of threads on the head portion of the bushing.

4 Claims, 4 Drawing Sheets

SUCKER PIN BUSHING

CROSS-REFERENCE TO RELATED APPLICATION

This application claims the benefit of U.S. Provisional Application No. 60/767,544, filed on Jun. 14, 2006, which is hereby incorporated by reference in its entirety.

BACKGROUND OF THE INVENTION

The present invention relates to injection molding devices, and more specifically to a sucker pin bushing of a multiple plate injection mold.

DESCRIPTION OF THE RELATED ART

In numerous injection molding applications, it is desirable to utilize molds with multiple plates. In a typical three-plate injection molding machine, as the name implies, there are three plates involved in the molding operation. FIG. 1 shows a sectional view of a three plate mold as described in herein. Typically these plates are referred to as the X plate 110, the B plate 120, and the A plate 130. A mold pattern 170 is formed between a portion of the B plate 120 and the A plate 130. A runner pattern 135 is formed on the A plate 130 which faces the X plate 110. The B plate 120 is bolted to a support plate 150. The support plate 150 is further secured to an ejector box or housing (not shown). The ejector box is clamped to a movable platen of the molding machine. The X plate 110 is bolted to a top clamp plate 160, usually with two or more shoulder bolts 145. The top clamp plate 160 is fixed to the opposing platen of the injection molding machine.

During the molding operation, the mold 170 and runner patterns 135 are filled with heated plastic injected from a reservoir 180 connected to the top clamp plate. When the plastic has cooled, the moving plate pulls the ejector box and the associated support plate 150 and B plate 120 away from the A plate 130, thus initiating the sequential opening of the mold plates and the eventual removal of the molded parts and runner 140.

As the mold opens, the B plate 120 and associated support plate 150 are pulled away and compression force is removed, which allows springs 200 between the A plate 130 and the X plate 110 to begin to expand, thereby creating a force which compresses the A plate 130 against the B plate 120 and separates the A plate 130 and X plate 110 at a first parting line. The runner 140 breaks free from the A plate 130 and remains attached to the sucker pins 190. Sucker pins 190 are pins secured to the top plate 160 and pass through an opening in the X plate 110. The sucker pins 190 serve to hold the runner 140 in place while the A plate 130, B plate 120 and the support plate 150 are moved away from the X plate 110. Further movement of the X plate 110 away from the top clamp plate 160 causes the runner 140 to be stripped from the sucker pins 190.

Typically there can exist a sucker pin bushing disposed in the opening in the X plate 110 through which the sucker pin 190 passes. FIG. 2 shows a sectional view of a typical sucker pin and sucker pin bushing arrangement. The sucker pin bushing 210 typically has a cylindrical body portion 222 and a head portion 224. The head portion 224 being larger in diameter than the cylindrical body portion 222. An opening for the sucker pin passes through both portions. A shoulder 223 is formed between the body portion 222 and the head portion 224. The opening in the X plate 110 is configured to accommodate the body portion 222 of the bushing 210. An enlarged portion of the opening in the X plate 110 accommodates the head portion 224 of the bushing 210. A ridge 225, complementary to the shoulder 223 of the bushing 210 is formed where the enlarged portion of the opening for the bushing head 224 meets the opening for the body portion 222 of the bushing 210. The shoulder 223 of the bushing 210 seats against this ridge 225. A jam screw 220 or similar retaining means is used to secure the bushing 210 in the opening in the X plate 110.

A common problem in three plate molding operations is flashing, that is excess plastic material from the molding process, getting into the workings of the sucker pin 190 and sucker pin bushing 210, as well as other mold components. This flashing prevents the runner 140 from stripping away from the X plate 110 as intended. When this happens, the runner 140 material can damage the mold by not dropping from between the X plate 110 and the A plate 130. Often, the only way to correct the flashing material from around the sucker pin 190 is to install a new larger sucker pin 190. This drilling operation for the larger sucker pin 190 can be complicated by the jam screw 220. The drilling operation can results in a larger diameter hole for the bushing 210 and excess work for the mold engineer.

There remains a need for an improved sucker pin bushing. Namely there remains a need for an improved sucker pin bushing that reduces or eliminates the occurrence of flashing around the sucker pin. There also remains a need for a sucker pin bushing that eliminates the need for the jam screw as a means of retaining the bushing.

SUMMARY

In view of the deficiencies described above, it is an object of the present invention to provide an improved sucker pin bushing, an improved sucker pin bushing that reduces or eliminates the occurrence of flashing around the sucker pin bushing.

It is a further object of the present invention to provide a sucker pin bushing that eliminates the need for the jam screw as a means of retaining the bushing.

The present invention is an improved sucker pin bushing. In various preferred embodiments, the improved sucker pin bushing maintains much of the configuration of a conventional sucker pin bushing, namely a body portion and a head portion having a larger diameter than the body portion. A shoulder is formed where the body portion meets the head portion. However, the need for a jam screw or other retaining means is eliminated by the present invention by the inclusion of threads on the head portion of the bushing. For the mold designer or mold engineer, the elimination of the jam screw or retaining means results in less parts being ordered, tracked and installed. For the mold operator, should a failure due to flashing around the sucker pin and or sucker pin bushing occur, having the threads on the sucker pin bushing itself prevents the sucker pin bushing from shifting/cocking/moving in its opening, as the bushing itself is secured into the X plate and not just merely held in place by another retainer. Ultimately this results in fewer failures or at least results in easier disassembly of the mold should a failure occur.

By having threads on the sucker pin bushing itself and eliminating the jam screw or other retaining means, the shape of the sucker pin bushing is no longer confined to the customary shape. In other various preferred embodiments, the sucker pin bushing may have a continuous diameter throughout its length (thus eliminating the head portion). Accordingly, engineering of the mold and installation of the sucker pin bushing are greatly simplified because all that is required for the sucker pin bushing is a single drilled and tapped hole. Again, because the sucker pin bushing is secured directly into the X plate, the bushing is prevented from shifting/cocking/moving in the opening.

Other features and advantages of the invention will be apparent from the following detailed description taken in conjunction with the following figures, wherein like reference numerals represent like features.

DETAILED DESCRIPTION OF THE INVENTION

Figure 1:
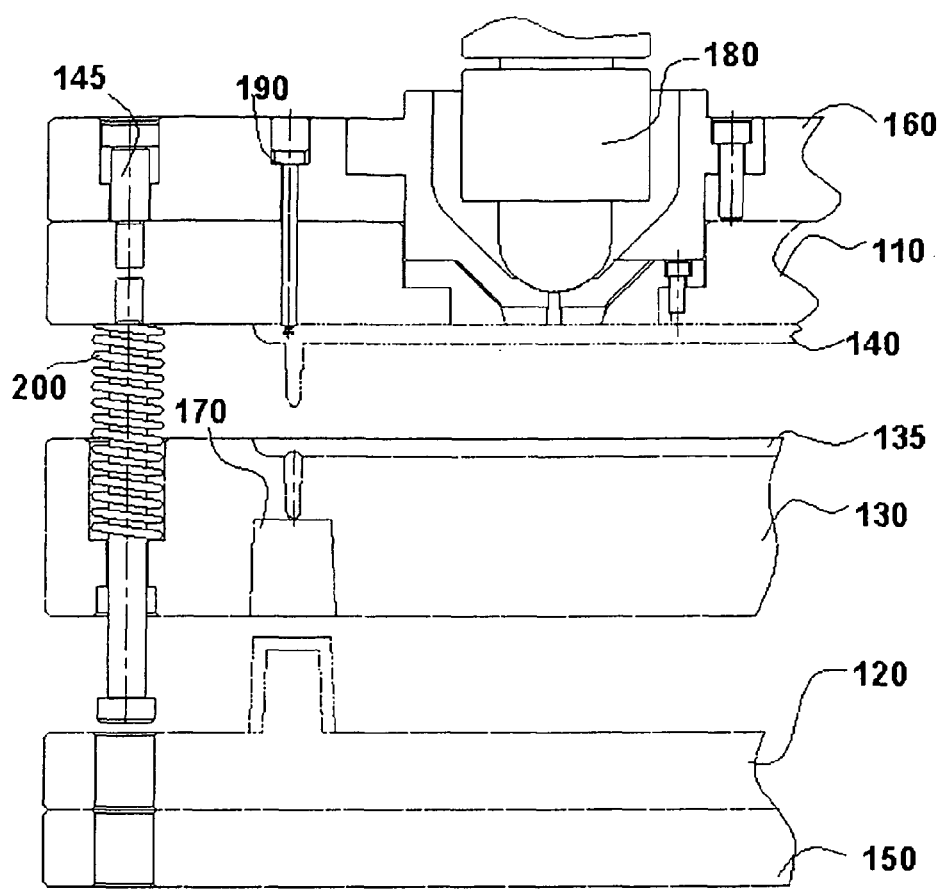
FIG. 1 shows a sectional view of a three plate mold as described in herein.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspect of the invention to the embodiments illustrated.

The present invention is an improved sucker pin bushing. FIG. 1 shows a sectional view of a three plate mold. The operation of the three plate mold is described above.

Figure 2:
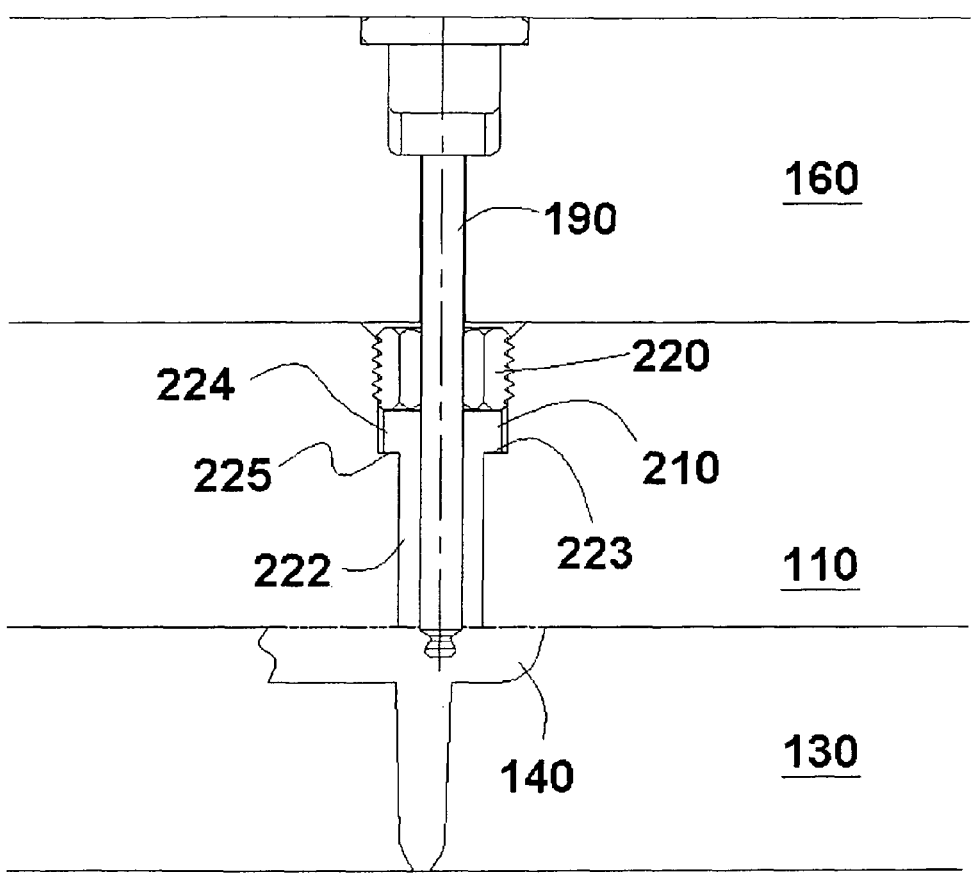
FIG. 2 shows a sectional view of a typical sucker pin and sucker pin bushing arrangement.

FIG. 2 shows a sectional view of a typical sucker pin and sucker pin bushing arrangement. As shown, the sucker pin 190 is secured in the top plate 160. The sucker pin 190 passes through an opening in the top plate 160 and a corresponding opening in the X plate 110. Disposed in the X plate 110, is the sucker pin bushing 210. The sucker pin 190 passes through and is coaxial with the sucker pin bushing 210. The sucker pin bushing 210 is secured into the X plate 110 with a jam screw 220 that locks the sucker pin bushing shoulder 223 in the opening in the X plate 110.

Figure 3:
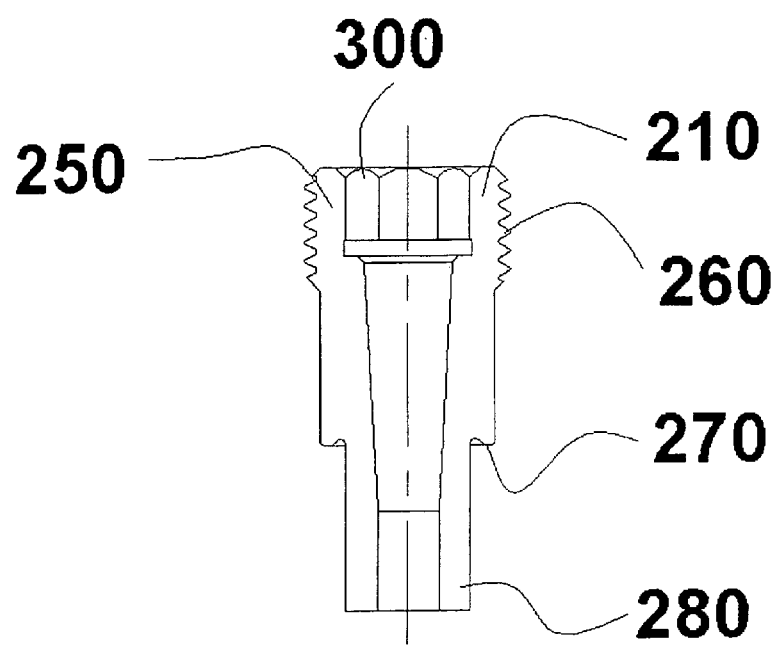
FIG. 3 shows a sectional view of an improved sucker pin bushing according to the present invention.

FIG. 3 shows a sectional view of an improved sucker pin bushing according to the present invention. In various preferred embodiments, the improved sucker pin bushing 210 maintains much of the configuration of a conventional sucker pin bushing, namely a body portion 280 and a head portion 250 having a larger diameter than the body portion 280. A shoulder 270 is formed where the body portion 280 meets the head portion 250. However, the need for a jam screw (shown at 220 in FIG. 2) or other retaining means is eliminated by the present invention by the inclusion of threads 290 on the head portion 250 of the bushing 210. Also located in the head portion 250 there can be means for receiving a fastening driver. As shown in FIG. 3, a hex receiving portion 300 is formed into the head portion 250. Means for receiving other types of fastening drivers may be used as well.

For the mold designer or mold engineer, the elimination of the jam screw 220 or retaining means results in less parts being ordered, tracked and installed. For the mold operator, should a failure due to flashing around the sucker pin 190 and or sucker pin bushing 210 occur, having the threads 290 on the sucker pin bushing 210 itself prevents the sucker pin bushing 210 from shifting/cocking/moving in its opening in the X plate 110, as the bushing 210 itself is secured into the X plate 110 and not just merely held in place by another retainer. Ultimately this results in fewer failures or at least results in easier disassembly of the mold should a failure occur.

Another advantage of the present invention over applications using a jam screw 220 or other retaining means is that with the jam screw 220, it is necessary to perform a bottom tapping operation for the jam screw 220 threads. A conventional tap has a lead in that does not cut a full thread for the first five to six threads. Typically the head portion 250 of a conventional sucker pin bushing 220 is not high enough to eliminate the bottom tapping operation. Whereas the head portion 250 of the present invention can be tall enough to permit a plug tap to cut the required threads, thus eliminating the need for a bottom tapping operation.

Furthermore, elimination of the jam screw 220 permits standardization of the sucker pin bushing 210 sizes. Sucker pin bushings 210 according to the present invention can be sized such that their total length corresponds to standard plate sizes. Accordingly, should the sucker pin bushing 210 of the present invention need to be replaced, no additional machining of the sucker pin bushing 210 is required. The sucker pin bushing 210 can simply be replaced.

Figure 4:
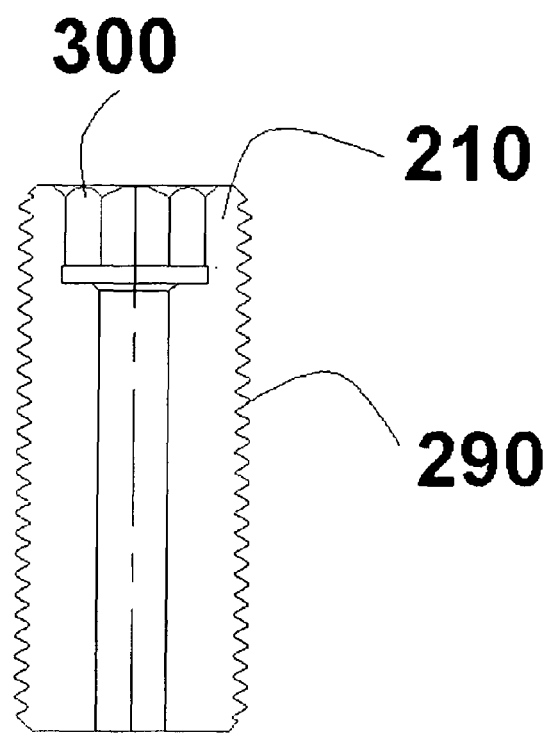
FIG. 4 shows a sectional view of an alternate embodiment of an improved sucker pin bushing according to the present invention.

FIG. 4 shows a sectional view of an alternate embodiment of an improved sucker pin bushing according to the present invention. By having threads 290 on the sucker pin bushing 210 itself and eliminating the jam screw 220 or other retaining means, the shape of the sucker pin bushing 210 is no longer confined to the customary shape. In other various preferred embodiments, the sucker pin bushing 210 may have a continuous diameter throughout its length (thus eliminating the head portion 250). Accordingly, engineering of the mold and installation of the sucker pin bushing are greatly simplified because all that is required for the sucker pin bushing 210 is a single drilled and tapped hole. Again, because the sucker pin bushing 210 is secured directly into the X plate 110, the bushing 210 is prevented from shifting/cocking/moving in the opening.

While specific embodiments have been illustrated and described, numerous modifications come to mind without significantly departing from the spirit of the invention and the scope of protection is limited by the scope of the accompanying claims.

What is claimed is:

1. An injection mold comprising,
at least a top plate, an X plate, an A plate, and a B plate, said top plate having at least one sucker pin secured thereon,
said at least one sucker pin passing through a sucker pin opening in said A plate,
said sucker pin opening in said X plate having a sucker pin bushing disposed in said sucker pin opening,
said sucker pin bushing having a head portion having a first outer surface having a first diameter and a top segment having a threaded surface and a lower segment having a non-threaded surface, a body portion having a second outer surface, having a second diameter, said second diameter smaller than said first diameter, wherein a shoulder forms where said head portion meets said body portion, a sucker pin opening coaxially passing through said head portion and said body portion, and a threaded portion on said first outer surface, and
said threaded portion engaging said X plate and securing said sucker pin bushing thereto.

2. An injection mold according to claim 1, wherein said sucker pin bushing further comprises means for receiving a fastening driver.

3. An injection mold comprising,
at least a top plate, an X plate, an A plate, and a B plate, said top plate having at least one sucker pin secured thereon, said at least one sucker pin passing through a sucker pin opening in said A plate, said sucker pin opening in said A plate having a sucker pin bushing disposed in said sucker pin opening, said sucker pin bushing having a body portion having an outer surface, a head portion of said outer surface having threads disposed on a top segment and a non-threaded lower segment, and a sucker pin opening passing through said body portion for receiving a sucker pin, and said threaded portion engaging said X plate and securing said sucker pin bushing thereto.

4. The injection mold according to claim 3, wherein said sucker pin bushing further comprises means for receiving a fastening driver.

\* \* \* \* \*